United States Patent
Allen

(10) Patent No.: US 9,185,003 B1
(45) Date of Patent: Nov. 10, 2015

(54) DISTRIBUTED CLOCK NETWORK WITH TIME SYNCHRONIZATION AND ACTIVITY TRACING BETWEEN NODES

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 13/875,980

(22) Filed: May 2, 2013

(51) Int. Cl.
  *H04L 12/24* (2006.01)
  *G06F 1/12* (2006.01)

(52) U.S. Cl.
  CPC . *H04L 41/50* (2013.01); *G06F 1/12* (2013.01)

(58) Field of Classification Search
  CPC ........................................................... G06F 1/12
  USPC ......................................................... 713/400
  See application file for complete search history.

(56) References Cited

U.S. PATENT DOCUMENTS

| | | | | |
|---|---|---|---|---|
| 5,408,506 | A * | 4/1995 | Mincher et al. | 375/134 |
| 5,586,307 | A * | 12/1996 | Wong et al. | 713/400 |
| 6,246,702 | B1 * | 6/2001 | Fellman et al. | 370/503 |
| 7,290,162 | B2 * | 10/2007 | Swarbrick et al. | 713/500 |
| 7,571,359 | B2 * | 8/2009 | Gutnik et al. | 714/700 |
| 8,494,009 | B2 * | 7/2013 | Fourcand | 370/509 |
| 8,826,060 | B2 * | 9/2014 | Bozak et al. | 713/502 |
| 8,887,110 | B1 * | 11/2014 | Zlatanovici et al. | 716/104 |
| 2005/0141565 | A1 * | 6/2005 | Forest et al. | 370/503 |
| 2008/0170592 | A1 * | 7/2008 | Hack et al. | 370/503 |

* cited by examiner

*Primary Examiner* — Suresh Suryawanshi
(74) *Attorney, Agent, or Firm* — Baker & Hostetler LLP

(57) ABSTRACT

Systems and methods are described for coordinating clocks in a distributed computing environment. In one embodiment, a plurality of groups of nodes are formed. Nodes within a group may be time-synchronized and time differences between groups may be tracked. Clock adjustments between groups may be accumulated for tracked activities. The accumulated clock adjustments may be used to determine an ordering of the tracked activities.

23 Claims, 9 Drawing Sheets

DISTRIBUTED CLOCK NETWORK WITH TIME SYNCHRONIZATION AND ACTIVITY TRACING BETWEEN NODES

BACKGROUND

A data center is one example of a distributed computing environment that houses computer systems, various networking, storage and other related components. The computing resources provided by a data center may include various types of resources, such as data processing resources, data storage resources, data communication resources and the like. To facilitate increased utilization of data center resources, virtualization technologies may allow a single physical computing machine to host one or more instances of virtual machines (VMs) that appear and operate as independent computer machines to a remotely connected computer user. Such complex computing environments allow for use of distributed services and scalable applications.

In a distributed computing environment, a group of computing resources may each contribute to a processing task. Consequently, determining which computing resource performed which aspect of a processing task may be useful for understanding the function and behavior of the distributed computing environment under various conditions. As such, tracing the activities of each computing resource for a particular processing task in a group of processing tasks that contribute to the overall performance of a processing task may be useful. In particular, ordering the processing tasks performed by each of the computing resources that contribute to performing the overall task can be determined based on timestamps. The use of timestamps in a distributed computing environment requires accurate and synchronized time sources in the distributed computing environment so that an order of events can be accurately determined.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
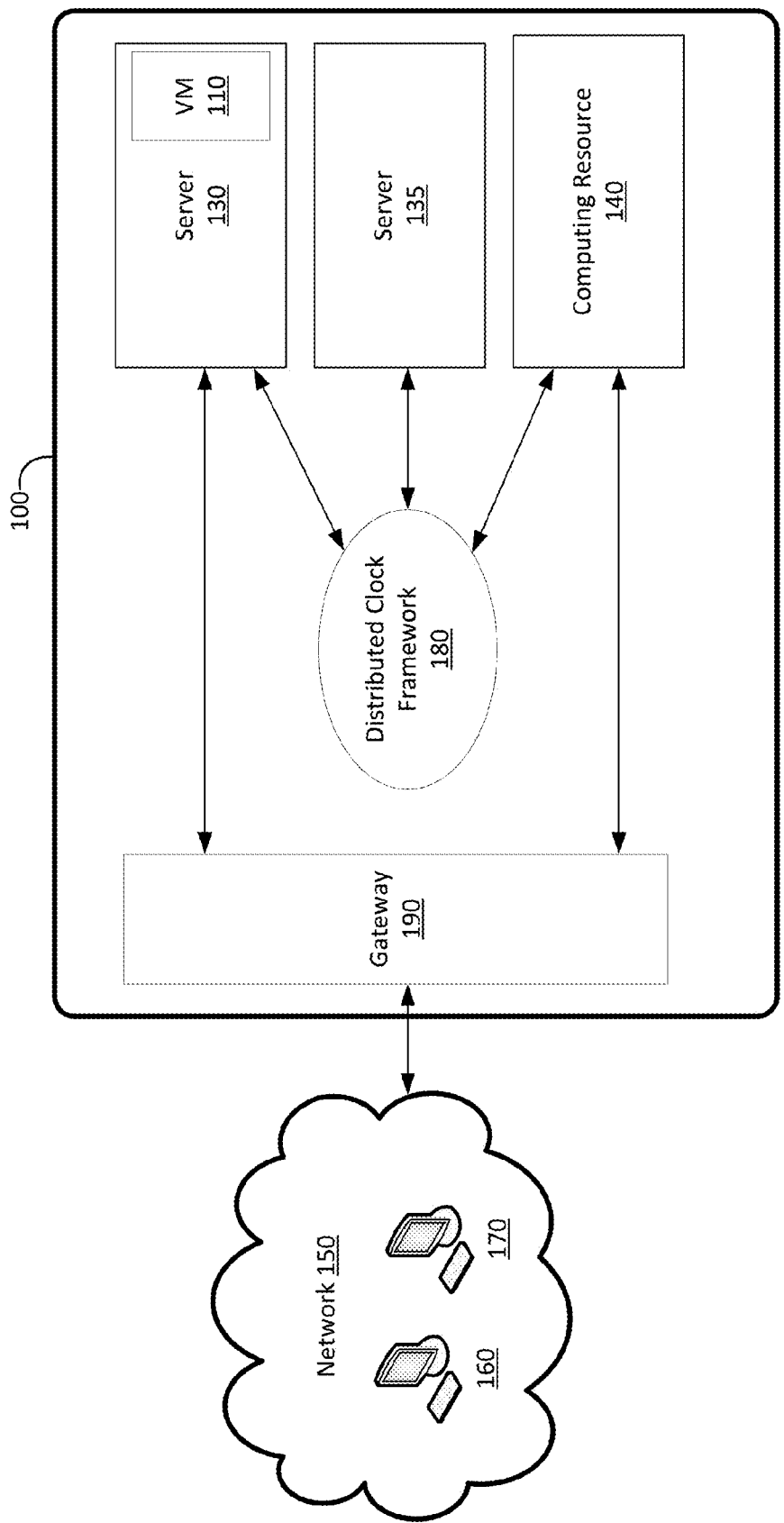
FIG. 1 is a diagram illustrating a mechanism for providing a clock network in accordance with the present disclosure.

The following detailed description is directed to forming clock networks and, using the clock networks, tracing activities in a distributed computing environment. Tracing may refer to recording the actions or operations of a software program or process. Tracing may include storing information by maintaining a log regarding a software program's execution. The trace information may be used, for example to diagnose problems or measure performance in a computing system. In the examples described herein, a data center is one example computing environment in which the described embodiments can be implemented. However, the described concepts can be applied generally to other computing environments.

Activity tracing among a group of nodes in a distributed computing environment may be useful for understanding the function and behavior of software executing in the distributed computing environment. Information about the executing software may be more useful when an order of events can be determined based on timestamps for the events. However, accurate and precise timestamps may be difficult to obtain in a distributed computing environment because the internal clocks of individual nodes in the distributed computing environment may differ. A clock, as used herein, may refer to a function that maintains a time value. A clock may be implemented in software or hardware or a combination thereof. The internal clocks of a node, even when initialized to the same initial time, may differ after some amount of time due to clock drift or other factors. A distributed computing environment therefore requires some form of time synchronization between nodes. However, existing network time synchronization solutions, such as Network Time Protocol (NTP), typically do not provide adequate synchronization and comparative errors of many parts per million may, nevertheless, result. Direct time synchronization solutions, such as radio or cable-linked clocks, may have lower comparative errors but require dedicated hardware. Dedicated hardware solutions may be cost prohibitive and infeasible with commodity distributed system infrastructure resources. Furthermore, as the number of nodes in the distributed computing environment increase to hundreds or thousands of nodes, maintaining synchronization of individual clocks may be difficult or impossible.

The present disclosure describes a self-forming network of distributed clocks to improve comparative error rates over existing approaches to network time synchronization. In one embodiment, nodes in the distributed computing environment may communicate with other nodes to form synchronized groups of nodes with synchronized clocks. As used herein, a node, which may also be referred to as a computing node or a compute node, may be implemented in a wide variety of computing environments, such as commodity-hardware computers, virtual machines, computing clusters and computing appliances. Any of these computing devices or environments may, for convenience, be described as nodes. Furthermore, the clock value of a distributed clock group may be referred to as a group time or a group clock. The clock value of a single node may be referred to as a machine clock, node clock or a node time.

In one embodiment, each synchronized group may elect a group leader to maintain and periodically refresh a clock time that the group may synchronize to. This clock may be the group leader's internal clock. A group with a synchronized clock may communicate with other groups via selected nodes in the group to provide inter-group tracking of group clocks based on a maintained clock skew between the groups. These selected nodes may be referred to as "boundary nodes" or "boundary points." In some embodiments, inter-group convergence may be achieved, while in other embodiments a boundary node associated with a group may track the differences between the group clock and the clock of another group as provided by a second boundary node to allow for a relative ordering of tracked activities.

Once the nodes in the distributed computing environment have been formed into groups of nodes that are synchronized within the groups, messages can be sent between the groups during performance of activities that are to be traced. Such trace messages may be used to accumulate clock skews as an activity transitions between the different groups of the clock network. The record of clock skew between groups may be used to improve accuracy when ordering trace activity records, thereby providing a more accurate basis for understanding the function and behavior of software executing in the distributed computing environment.

FIG. 1 is a diagram illustrating an example context for a distributed clock framework 180 for forming and maintaining a distributed clock network in a distributed computing environment 100 in accordance with the present disclosure. Referring to FIG. 1, the distributed computing environment 100 may contain a number of nodes executing within computing environment 100 in which each node has a separate notion of time. For example, computing environment 100 may include nodes such as servers 130 and 135 and computing resource 140 that may be, for example, a storage device or another computing device. The computing environment 100 may also include a virtual machine instance 110 that may execute, for example, on one or more server computers 130. It will be appreciated that some embodiments may involve additional virtual machine instances that may be instantiated on additional server computers in computing environment 100.

FIG. 1 also illustrates a network 150 that may include one or more nodes such as computers 160 and 170. According to one embodiment, virtual machine instance 110 may be configured to provide computing services to a computer user (not shown) of network 150 via a gateway 190 and computers 160 and 170. For example, virtual machine instance 110 may provide a set of remote access enterprise applications to a group of users who may, for example, be employees of an enterprise customer.

The nodes in computing environment 100 may contribute to the performance of a task for which activity tracing is desired. If the task is distributed over a number of nodes, the various operations that are required to complete the task may be ordered in time, and it may be desirable to determine what one node performed relative in time to another node. However, the nodes may have different times that need to be synchronized in order to accurately trace the various operations that are performed to complete the distributed task. In one embodiment, distributed clock framework 180 may be provided to facilitate synchronization of times and tracing of activities. Distributed clock framework 180 may include functionality that may be implemented on one or more nodes within computing environment 100. In one embodiment, each node within computing environment 100 may implement functionality to provide synchronization of times and activity tracing. In other embodiments, only nodes for which synchronization of times and activity tracing is desired may implement the functionality. Additionally and optionally, distributed clock framework 180 may include functionality implemented on one or more nodes of computing environment 100 for centrally managing and facilitating synchronization of times and activity tracing.

A user, administrator, service or any computing resource in computing environment 100 may send a request to distributed clock framework 180 to trace a computing activity such as a workflow in the computing environment 100 in order to troubleshoot a particular aspect of a distributed application. A computing activity may be any task, process, or a number of tasks or processes for which an ordering of events may be desired. The distributed clock framework 180 may facilitate the synchronization of clocks used by resources in computing environment 100 in order to provide an accurate and reliable basis of time for tracing a requested activity. Distributed clock framework 180 may facilitate the formation of distributed clock groups as further described below. Distributed clock framework 180 may also maintain timing data during performance of the traced activity in order to determine an order of events for the traced activity. Services provided by the distributed clock framework 180 may be requested directly by a customer of the data center, by an administrator of the data center, a service or any computing resource within the data center such as server 130. Server 130 may also send a request on behalf of itself or on behalf of other servers.

Figure 2:
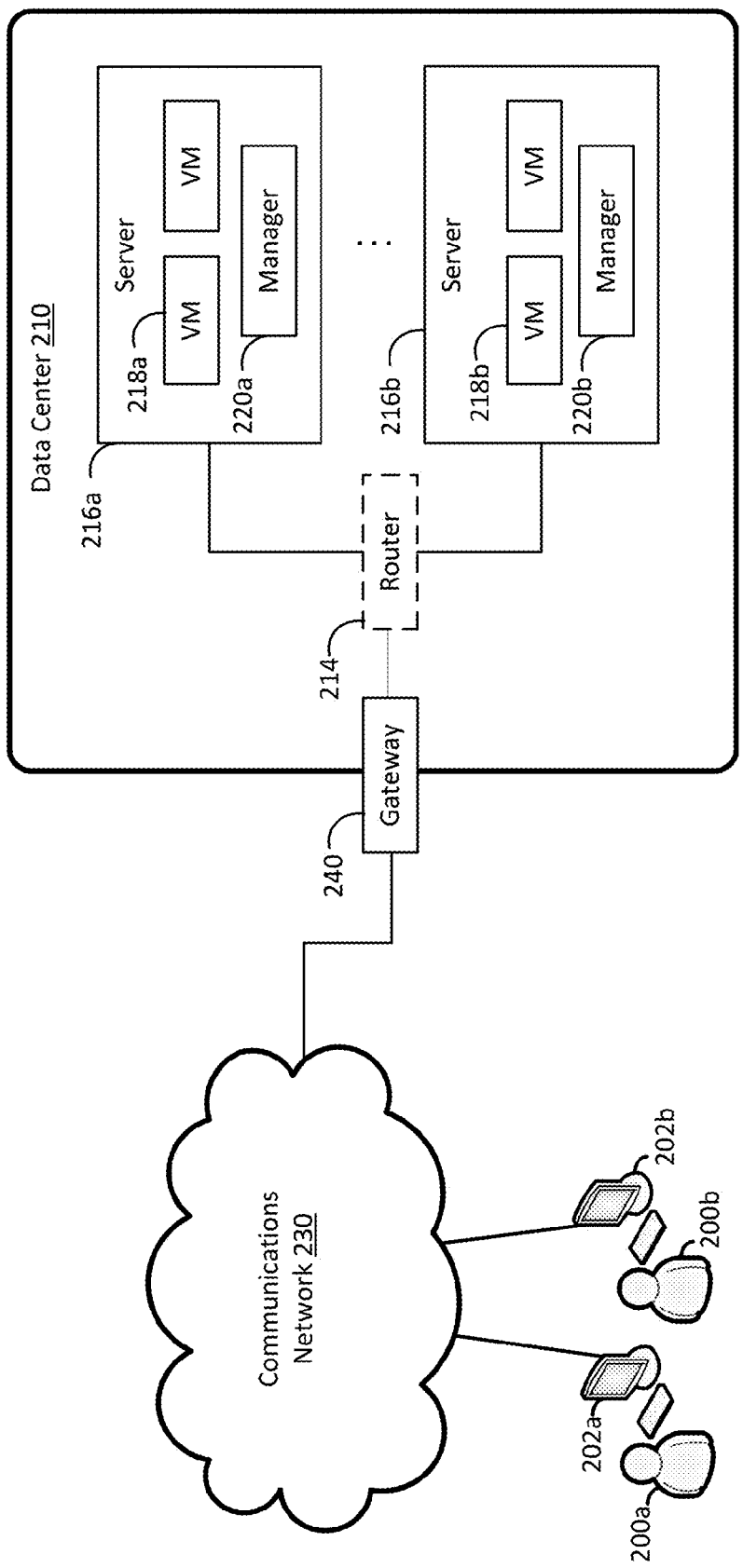
FIG. 2 illustrates an example computer system that may be used in some embodiments.

FIG. 2 illustrates another example computing environment in which the embodiments described herein may be implemented. FIG. 2 schematically illustrates an example data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may, for example, correspond to computing environment 100 in FIG. 1.

Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources—consisting of many processor cores, large amounts of memory and/or large storage capacity—and small resources—consisting of fewer processor cores, smaller amounts of memory and/or smaller storage capacity. Customers may choose to allocate a number of small processing resources as Web servers and/or one large processing resource as a database server, for example.

Data center 210 may include servers 216a and 216b (which may be referred herein singularly as "a server 216" or in the plural as "the servers 216") that provide computing resources available as virtual machine instances 218 and 218b (which may be referred herein singularly as "a virtual machine instance 218" or in the plural as "the virtual machine instances 218"). The virtual machine instances 218 may be configured to execute applications, including Web servers, application servers, media servers, database servers and the like. Other resources that may be provided include data storage resources (not shown), and may include hard drives, solid state storage drives or other storage devices and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a network of linked networks and possibly operated by various distinct parties, such as the Internet. In embodiments, communications network 230 may be another network, such as, for example, a corporate or university network that is wholly or partially inaccessible to non-privileged users. In embodiments, communications network 230 may include one or more networks with access to and/or from the Internet.

Communication network 230 may provide access to computers 202. User computers 202 may be computers utilized by users 200 or other users of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216 shown in FIG. 2 may be servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example by forwarding packets or other data communications as appropriate based on characteristics of such communications (e.g., header information including source and/or destination addresses, protocol identifiers, etc.) and/or the characteristics of the network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 2, each of the servers 216 may have a separate notion of time and may be considered nodes for which activity tracing is desired. Furthermore, each of the VM's 218 may also have a separate notion of time and may be considered nodes for which activity tracing is desired. In some embodiments, tasks can be distributed across communications network 230 to one of the user computers 202, which may have a separate notion of time and may be considered nodes for which activity tracing is desired. The present disclosure contemplates all such scenarios in which time synchronization and activity tracing is desired, and is not limited to any particular computing environment.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system or an article of manufacture, such as a computer-readable storage medium. While the subject matter described herein is presented in the general context of program modules that execute on one or more nodes, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

As discuss above, a distributed clock framework such as distributed clock framework 180 of FIG. 1 may be implemented in one or more nodes and configured to receive requests to provide timing data with regard to a requested activity. Distributed clock framework 180 can be implemented across several nodes or on one node. The nodes may be configured or programmed to participate in a distributed clock framework as a node in the distributed clock framework or as a device providing one or more functions of the distributed clock framework 180.

Figure 3:
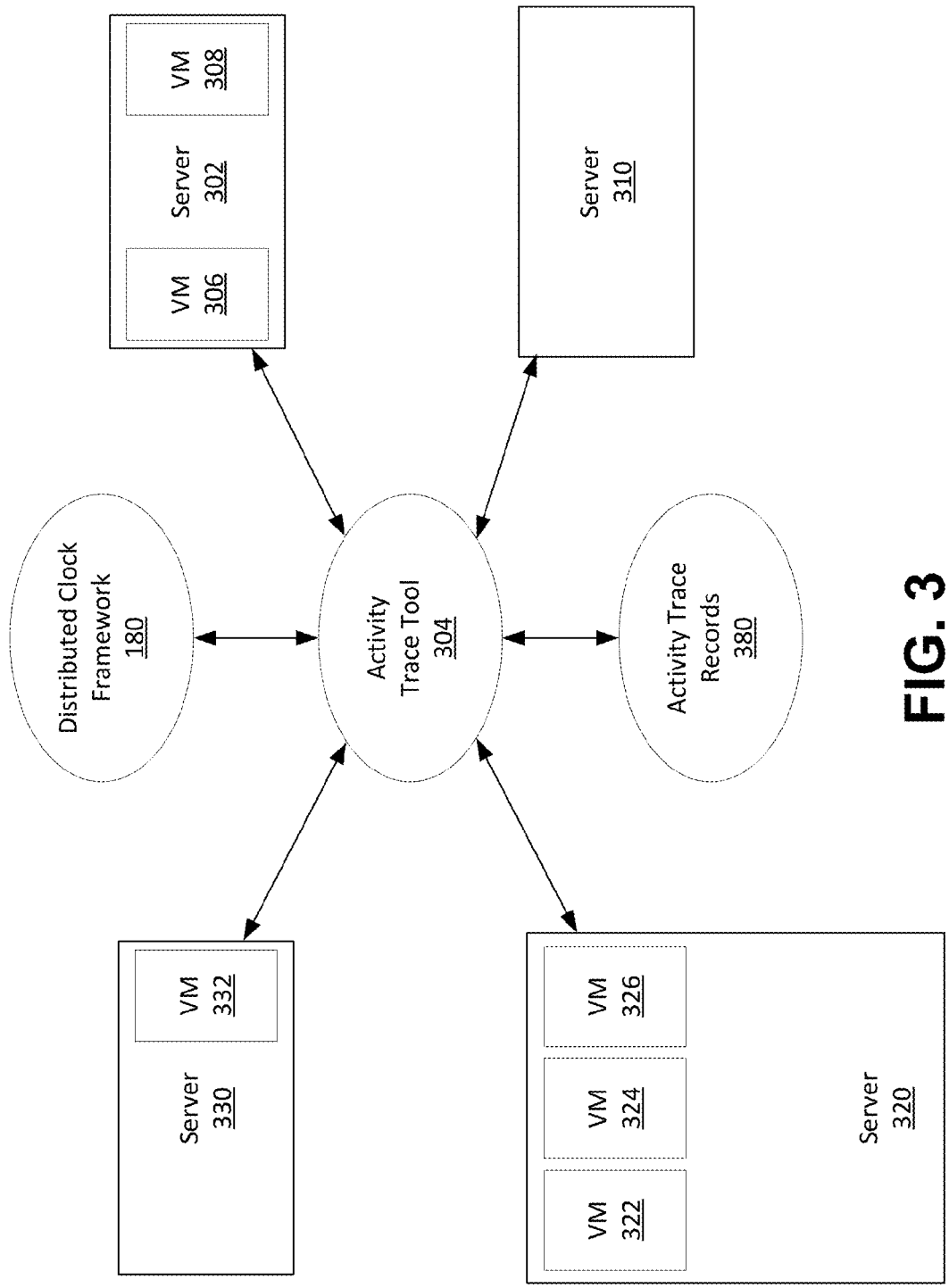
FIG. 3 is a diagram illustrating a mechanism for providing a distributed clock framework in accordance with the present disclosure.

FIG. 3 illustrates an embodiment in which distributed clock framework 180 may be implemented in a data center 210 such as the one illustrated in FIG. 2. Referring to the figure, server computers 302, 310, 320 and 330 may communicate with an activity trace tool 304, which may track and record timing information for computing activities or portions of computing activities. The activity trace tool 304 may be a software function that may execute on one or more nodes within a computing environment such as computing environment 100 or data center 210. The activity trace tool 304 may be configured to log operations and other events related to execution of a software program. Server computer 302 may host virtual machine instances 306 and 308. Server computer 310 may not host any virtual machine instances; server computer 320 may host virtual machine instances 322, 324 and 326; and server computer 330 may host virtual machine instance 332.

A user may send a request for an activity trace to distributed clock framework 180 of FIG. 1 via server 310, for example. Distributed clock framework 180 may facilitate formation of distributed clock networks, as further described below, in order to provide a synchronized basis for tracing the activity. Distributed clock framework 180 may interact with an activity trace tool 304 to track events during execution of the traced activity. Distributed clock framework 180 may also log events in an activity trace records data store 380. As portions of the tracked activity are performed by one or more of the computing resources such as servers 302, 310, 320 and 330 and/or virtual machines running on one or more of the servers, activity trace tool 304 may log timing information such as timestamps along with specific activity information and store the timing information in activity trace records data store 380. The collected timing information can be analyzed to determine a timing record of the traced activity and an order of events.

Figure 4:
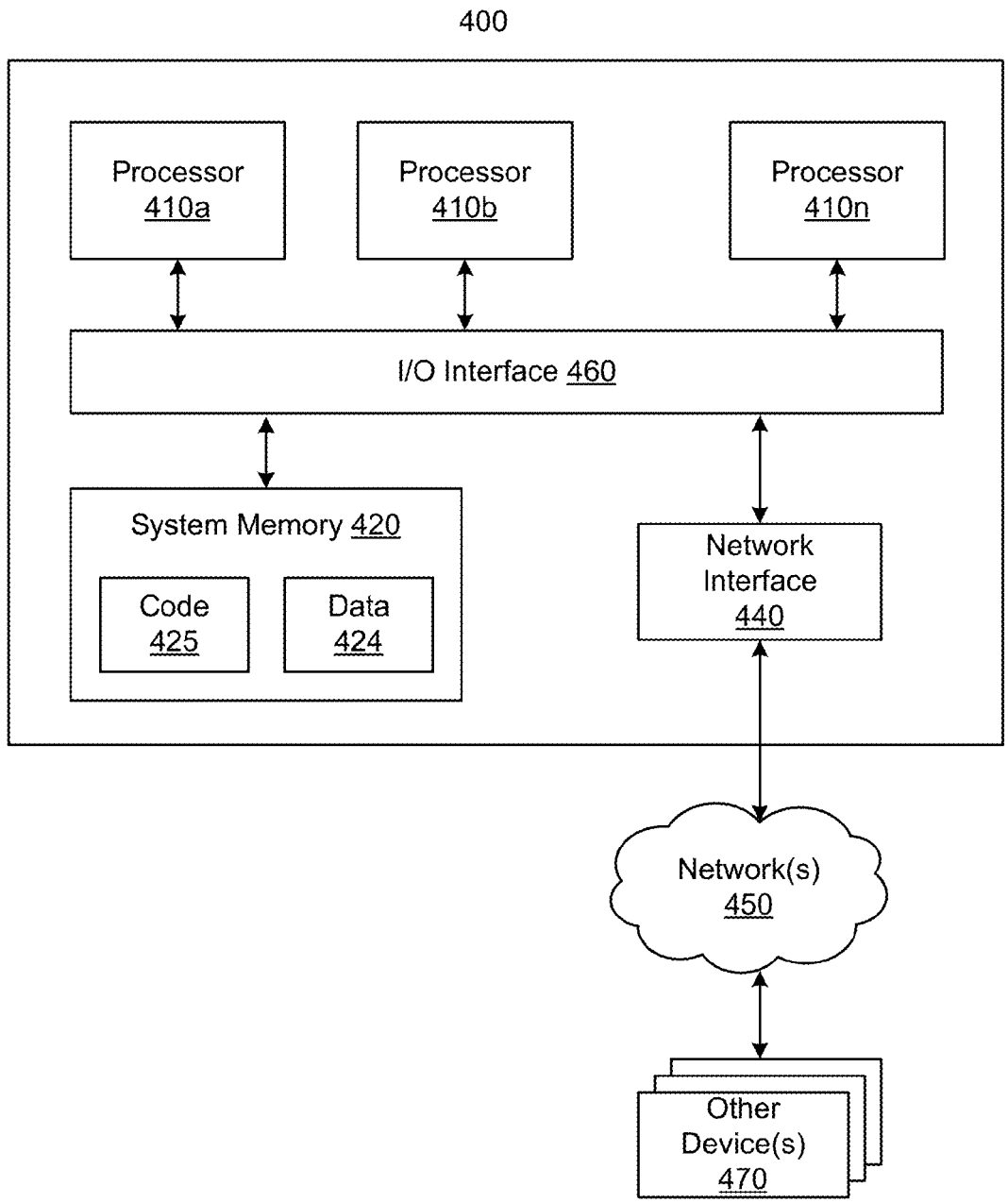
FIG. 4 is a diagram illustrating an example computing device that may be used in some embodiments.

In at least some embodiments, a server that implements a portion or all of one or more of the technologies described herein, including the techniques to implement the functionality of a distributed clock framework and activity trace tool may include a general-purpose computer system that includes or is configured to access one or more computer-accessible media. FIG. 4 illustrates such a general purpose computing device 400. In the illustrated embodiment, computing device 400 includes one or more processors 410a, 410b, and/or 410n (which may be referred herein singularly as "a processor 410" or in the plural as "the processors 410") coupled to a system memory 420 via an input/output (I/O) interface 460. Computing device 400 further includes a network interface 440 coupled to I/O interface 460.

In various embodiments, computing device 400 may be a uniprocessor system including one processor 410 or a multiprocessor system including several processors 410 (e.g., two, four, eight or another suitable number). Processors 410 may be any suitable processors capable of executing instructions. For example, in various embodiments, processors 410 may be general-purpose or embedded processors implementing any of a variety of instruction set architectures (ISAs), such as the x86, PowerPC, SPARC, or MIPS ISAs or any other suitable ISA. In multiprocessor systems, each of processors 410 may commonly, but not necessarily, implement the same ISA.

System memory 420 may be configured to store instructions and data accessible by processor(s) 410. In various embodiments, system memory 420 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 420 as code 425 and data 424.

In one embodiment, I/O interface 460 may be configured to coordinate I/O traffic between processor 410, system memory 420 and any peripheral devices in the device, including network interface 440 or other peripheral interfaces. In some embodiments, I/O interface 440 may perform any necessary protocol, timing or other data transformations to convert data signals from one component (e.g., system memory 420) into a format suitable for use by another component (e.g., processor 410). In some embodiments, I/O interface 460 may include support for devices attached through various types of peripheral buses, such as a variant of the Peripheral Component Interconnect (PCI) bus standard or the Universal Serial Bus (USB) standard, for example. In some embodiments, the function of I/O interface 460 may be split into two or more separate components, such as a north bridge and a south bridge, for example. Also, in some embodiments some or all of the functionality of I/O interface 460, such as an interface to system memory 420, may be incorporated directly into processor 410.

Figure 5:
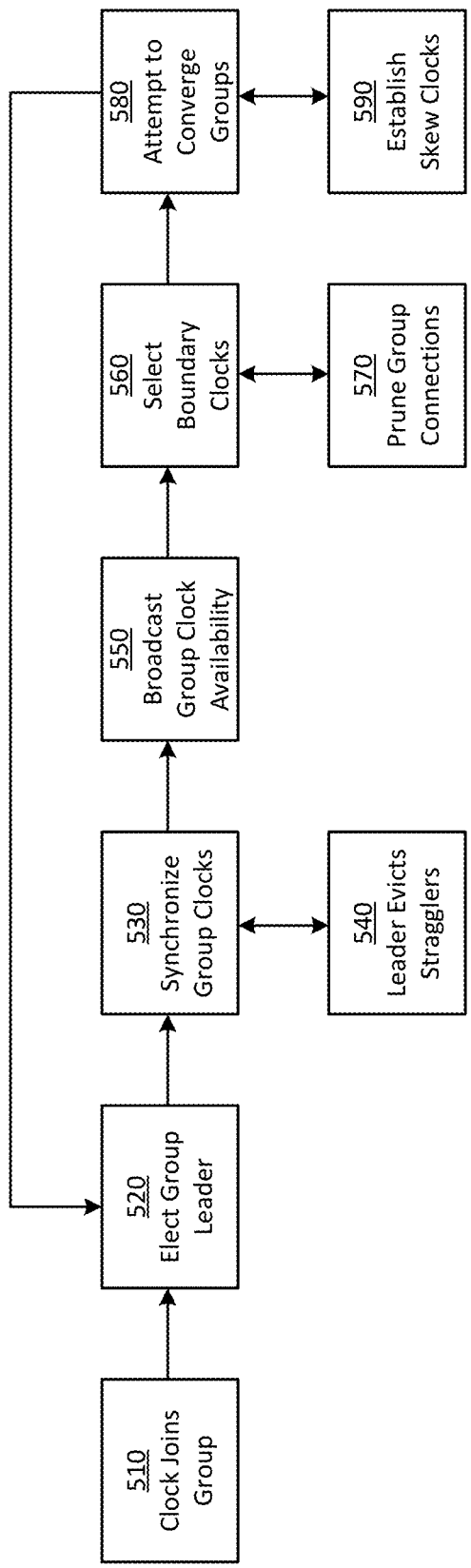
FIG. 5 is a diagram illustrating an example process for forming a clock network in accordance with the present disclosure.
Figure 6:
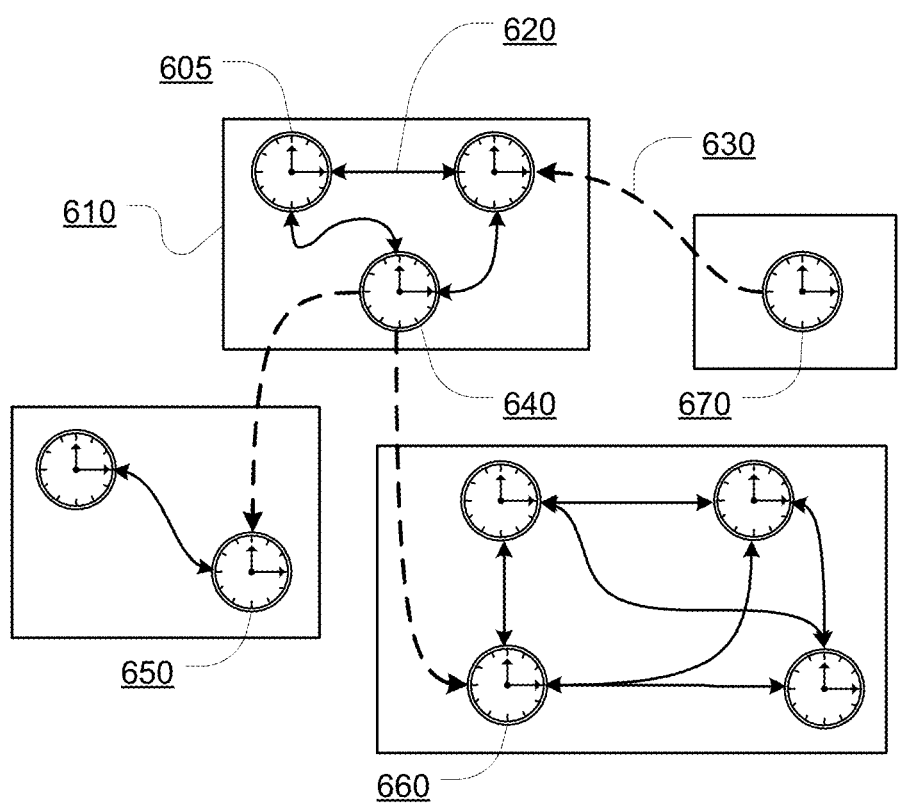
FIG. 6 is a diagram illustrating an example computing device that may be used in some embodiments.

Network interface 440 may be configured to allow data to be exchanged between computing device 400 and other node or nodes 470 attached to a network or networks 450, such as other computer systems or devices as illustrated in FIGS. 5 and 6, for example. In various embodiments, network interface 440 may support communication via any suitable wired or wireless general data networks, such as types of Ethernet networks, for example. Additionally, network interface 440 may support communication via telecommunications/telephony networks such as analog voice networks or digital fiber communications networks, via storage area networks such as Fibre Channel SANs or via any other suitable type of network and/or protocol.

In some embodiments, system memory 420 may be one embodiment of a computer-accessible medium configured to store program instructions and data as described above for FIGS. 1 through 3 and 5 through 9 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 400 via I/O interface 460. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 400 as system memory 420 or another type of memory. Further, a computer-accessible medium may include transmission media or signals such as electrical, electromagnetic or digital signals, conveyed via a communication medium such as a network and/or a wireless link, such as may be implemented via network interface 440. Portions or all of multiple computing devices such as those illustrated in FIG. 4 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems.

Many computing environments such as data centers are large and complex and can include a vast number of interconnected devices. Technologies such as virtualization can increase the complexity. Computing environments thus may include a mix of various types of data flowing through both virtual and physical components. Computing devices such as servers and routers may have complex interactions, and behaviors in one area can affect the performance of the entire computing environment. Activities in such a computing environment should therefore be analyzed not only in their local environment but in conjunction with other devices in the computing environment to ensure that the computing environment on the whole provides an expected level of performance. In order to make this possible, the activities of the computing environment should be accurately time stamped in order to understand the order of events of the activities.

In particular, such computing environments may perform distributed computing activities where a task may be divided into a number of operations, each of which may be executed by one or more nodes in the computing environment. The nodes may communicate with one another by message passing to coordinate the performance of the operations. As the number of nodes in the computing environment increases, the scope of potential interfaces and activities may increase dramatically. This makes it extremely difficult for administrators to analyze and trace the activities.

FIG. 5 illustrates an exemplary method for establishing a distributed clock network. Referring to FIG. 5, operation 510 illustrates that a node in the distributed computing system may join a distributed clock group. A distributed clock network may correspond to the system 100 described in FIG. 1, and may comprise any number of nodes and other devices in a system such as computing environment 100. A node may announce its availability to the distributed clock network by publishing its availability to the distributed clock network. A node may publish its availability by adding an identifier associated with the node to a list of available nodes, or by broadcasting a presence message. For example, the node may send multicast messages, register with a directory service, contact local coordinator nodes, or the like to broadcast the node's presence.

Subsequent to broadcasting the presence message, the node may elect to join a distributed clock group. In one embodiment, the node may find other nodes based on their presence messages. In one embodiment, the group of nodes may elect to create a new distributed clock group. In another embodiment, the node may find other nodes in an existing distributed clock group and elect to join the group. The node may incorporate preferential behavior in determining whether to create a new distributed clock group or join an existing distributed clock group. For example, the node may be associated with a policy that indicates preference for joining a large distributed clock group over joining a small distributed clock group that might not continue to exist as a viable distributed clock group for a longer time period. As another example, the node may be associated with a policy that indicates a preference for joining a new distributed clock group over joining an old distributed clock group in order to reduce disruption to established distributed clock groups. As another example, the node may be associated with a policy that indicates a preference for joining an existing distributed clock group over creating a new distributed clock group. The weights of these and other preferences may over time change so that the node always moves toward a decision rather than holding out for a perfect match.

Returning to FIG. 5, operation 520 illustrates that the distributed clock group may elect a group leader. The distributed clock group may use a leader election protocol to elect one of its members to be the group leader. The leader election protocol may be any process for designating a member as the leader among the group members. The group members may communicate among themselves in order to decide which of the group members will be elected as the leader. Leader elections may also occur when the leader crashes or becomes unresponsive, the group membership changes, or a network event partitions the group. In one embodiment, nodes may be assigned a machine ID and the leader election protocol may be a distributed fault-tolerant algorithm for identifying the node with the largest ID. In another embodiment, the group may elect the leader based on a topological property of the group, such as minimizing the diameter of network paths through the leader or minimizing the latency for exchanging requests. The topological property may be any invariant property of the group's topology such as the group's connectedness.

Operation 530 illustrates that the distributed clock group may synchronize their clocks. Members of the group may, in coordination with the leader, negotiate a shared time to which all clocks in the group will be synchronized. The members of the group may exchange time information to facilitate negotiation of the shared time. The time information may include, for example, current time values for the members of the group and clock adjustment requests. For example, members may negotiate a shared time by submitting clock adjustment requests to the leader until a majority vote is taken for the group time to be adopted by the group. The nodes in the group may then alter the internal time of the node to match the group time. After the distributed clock group has synchronized their clocks in this fashion, the distributed clock group may be considered as having synchronized the individual node times with the group time. In some embodiments, one or more nodes of the group may not be capable of altering its internal time to match the leader, and in such circumstances, such nodes may leave the group and undergo a new broadcast and attempt to join a different group.

Operation 540 illustrates that during the synchronization process, the group leader may be assigned the authority to evict misbehaving members of the group. Evicted groups may be disassociated from the group. For example, the group leader may evict nodes that do not respond to vote requests or evict nodes whose clocks or adjustment requests are significantly greater than a predetermined level or amount.

Operation 550 illustrates that the distributed clock group may broadcast availability of the group to other groups in the distributed computing system. The leader, a node designated by the leader, or even more than one of the nodes in the group may broadcast an availability message identifying the group. The group may be identified by, for example, a globally unique identification number or by a name derived from the identities of machines in the group. The group may broadcast availability by sending multicast messages, registering with a directory service, contacting global network coordinator nodes, or the like to broadcast availability.

Operation 560 illustrates that the distributed clock group may establish a boundary relationship to another distributed clock group. Responsive to a distributed clock group broadcasting an availability message, another distributed clock group may decide to establish communications with the group and determine inter-group tracking of clocks based on a maintained clock skew between the groups. The broadcasting distributed clock group and the responsive distributed clock group may each elect one or more members to act as a boundary point between the two groups. A distributed clock group may have one member manage all of the group's boundary points or may vary the elected members on a per-case basis. For example, a node having a best average connectivity with the members of the another group or having a best connectivity with the boundary point for the another group may manage the group's boundary points. The boundary may by convention be assigned a direction (i.e., an ordering between the two groups) for consistency in referencing the boundary although network connectivity across the boundary may be bidirectional. Connectivity may be determined by the ability to connect to or communicate between nodes, for example based on the number of intermediate connections between the nodes or the topology of the network connection between the nodes.

Operation 570 illustrates that when creating boundary points, the distributed clock group may attempt to increase sparseness of the resulting network by pruning boundary links into a directed acyclic graph. Maintaining a directed acyclic graph for the boundary links may benefit time measurements by, for example, giving each pair of nodes in the network a unique routing path along which to measure time. The distributed clock group may prune boundary links by sending exploration messages to each of its boundary points. A group receiving an exploration message may record its group identifier into the message and forward the message to each of its boundary points except for the immediate sender. In this fashion, loops in the network graph may be detected by a distributed clock group receiving an exploration message it has previously seen. The distributed clock group receiving the exploration message may use the recorded group identifiers to identify a boundary point that may be severed or changed to eliminate the redundant routing path.

Operation 580 illustrates that the distributed clock group may attempt to converge its clock with the clock of another distributed clock group. The distributed clock group may attempt to converge its shared clock with the shared clock of the other distributed clock group by submitting clock adjustment requests between the boundary nodes. The boundary node may forward the clock adjustment request to the group leader or hold group elections to determine whether to accept the request. Accepting a clock adjustment request may in some embodiments cause the distributed clock group and the other distributed clock group to merge memberships into a single group.

The other distributed clock group may reject the clock adjustment request, or this process may occur without the groups ever attempting to merge or converge clocks. In a network, clock skew may refer to the difference in time for clocks of different nodes in the network. Operation 590 illustrates that the boundary nodes for each distributed clock group may periodically exchange clock messages based on their current clock values to track the clock skew between the groups as either an absolute difference in times, as a different frequency for clock ticks, or both. For example, after exchanging clock messages, the boundary node for the distributed clock group may determine that the clock for the other distributed clock group is approximately 33 ns ahead of the group clock and moving (changing) at a rate of 1 ns/minute. Accordingly, the boundary node may maintain a clock skew between the two groups based on this determination. The boundary node may periodically update this estimate based on further clock message exchanges. Because the clocks within a distributed clock group are considered to be synchronized, the clock value of the boundary node may be considered to be the clock value of the distributed clock group to which the boundary node belongs. When exchanging clock values via clock messages as described above, the boundary nodes may exchange additional information. The exchanged information may be referred to as group clock information, and may include the group time, an identifier for the distributed clock group, and other information.

The boundary node for the distributed clock group may provide clock skew information for nodes in the group needing to reference time in the other distributed clock group. For example, the boundary node may respond to requests to provide skew information, may send skew information to the group leader, or may periodically broadcast the skew information between the group and a second group to nodes in the distributed clock group.

FIG. 6 illustrates an example network 600 of distributed clock groups. Distributed clock groups such as group 610 are shown as boxes with connections between the clocks (such as clock 605) in a group shown as solid double-ended lines such as connection 620. A connection may correspond to established communications between nodes in a distributed clock group as discussed above, where the nodes in the group have synchronized their clocks. The group may have boundary clocks 640, 650, 660, and 670. The groups may be connected by establishing communications between the boundary clocks 640, 650, 660, and 670 as indicated by dashed single-ended lines such as line 630. The communications between the boundary clocks may be established so as to form a directed acyclic graph between the boundary clocks. In one embodiment, the directed acyclic graph may be a polytree in which the directed graph is formed by assigning a direction to each edge of the graph such that there is exactly one directed network path between any two nodes. In other words, the directed acyclic graph may be formed such that there are no undirected cycles. Such a directed acyclic graph may also be referred to as a singly connected network or an orient tree. A clock skew between any two group clocks in the network may be uniquely determined by the clock skews accumulated along the boundary clock connections following the directed acyclic graph.

Various aspects of the disclosure are now described with regard to examples and embodiments for a self-forming network of distributed clocks to improve comparative error rates over existing approaches to network time synchronization. Nodes in a distributed system may participate in a clock network by forming distributed clock groups as described above. Trace messages may be transmitted and used to accumulate clock skews throughout the lifetime of the trace messages as a traced activity is acted upon by different distributed clock groups. The accumulated clock skews may be used to improve accuracy in ordering and spacing trace records.

Figure 7:
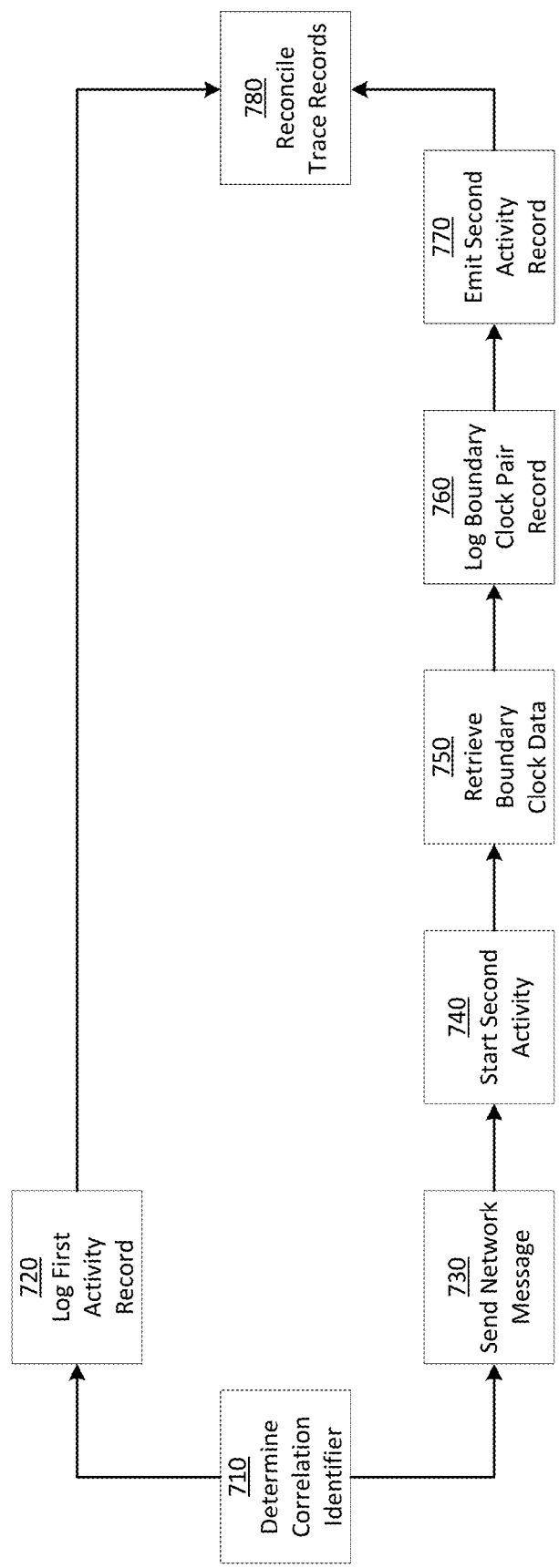
FIG. 7 is a diagram illustrating an example process for activity tracing in accordance with the present disclosure.

FIG. 7 illustrates an example method for using a distributed clock network to improve trace accuracy. Operation 710 illustrates that a correlation identifier may be determined for a distributed activity or operation. A distributed activity or operation may be any action taken by a resource in the distributed computing environment for which activity tracing is desired. In some embodiments, the correlation identifier may an identifier for the distributed activity and may comprise an exogenous property such as a globally unique identifier generated for the distributed activity. In other embodiments, the correlation identifier may be derived from a portion of content present in the activity's state, messages associated with the distributed activity, or other associable content. For example, the correlation identifier may be derived from a purchase order number, customer name, sequence number, or other portion of content associated with the distributed activity. A distributed activity that is to be traced may be referred to as a tracked activity.

Operation 720 illustrates that a first activity record for a first node of a first distributed clock group may be logged. The logged first activity record may include a record of performing a first portion of the tracked activity and a first timestamp indicating a time at which the first portion of the tracked activity was performed. The first activity record may be logged by, for example, writing the record to a log file or a tracing service. Such a log service may, for example, correspond to activity trace records data store 380 of FIG. 3.

Operation 730 illustrates that a network message may be sent to a second node of a second distributed clock group. The tracked activity may take place before or after logging the first activity record. The network message may signal or instruct the second node to perform a second portion of the tracked activity. For example, the first and second nodes may represent web services and sending a network message may correspond to the first service invoking the second service to perform a portion of work as a dependency of the first node. The network message may be based at least in part on the correlation identifier to correlate the operation of the second node with the operation of the first node.

In some embodiments, the first node may not send the network message to the second node, and the second node may perform the second portion of the tracked activity without a preliminary coordinating action with the first node. In other embodiments, a service such as distributed clock framework 180 depicted in FIG. 3, activity trace tool 304 depicted in FIG. 3, or some other service or function may cause the first and second portions of the tracked activity to be initiated.

The network message may include boundary clock data based on the route between the first node and second node. In one embodiment, the route between the first and second nodes may be indicated by communications between boundary nodes between the first and second distributed clock groups. The boundary clock data may indicate a clock skew between the first and second nodes, such as by describing an offset and relative speed for the clocks used by the two nodes.

In one embodiment, the network message may encode the boundary clock data using an envelope format to attach the boundary clock data to an application message. For example, the network message may comprise an envelope including message headers and a message body with the boundary clock data included as a message header and the application message included as the message body.

In some embodiments, the first node may transmit multiple network messages to the second node. For example, the first node may send a first network message include the application message and a second network message including the boundary clock data. The first node may omit sending the second network message if the information may be inferred by the second node. For example, if the first node sends multiple application messages to the second node, the first node may send an additional network message including the boundary clock data with the first of the multiple application messages and not send additional network messages with the remainder of the multiple application messages.

The boundary clock data may be determined using the positions of the first node and the second node in a distributed clock network as described above. The distributed clock network may, for example, include a distributed network as depicted in FIG. 6. The boundary clock data may be determined based at least in part on communications between boundary clocks in the distributed clock network along a uniquely chosen route between the first and second groups.

In some embodiments, the boundary clocks in the distributed clock network may be formed as a directed acyclic graph. In one embodiment, the boundary clock data may be determined by treating the graph as an undirected graph and finding the shortest network path through the undirected graph connecting the first node and second node. The boundary clock data may be determined by the accumulation of the clock skews along the edges of the shortest network path.

In some embodiments the network message may include additional boundary clock data. For example, the network message may travel from the first node to the second node by way of a third node, such as if the third node was performing a third portion of the tracked activity. The network message may include boundary clock data relating the first node to the third node and boundary clock data relating the third node to the second node. Alternatively, the network message may use the additional boundary clock data to compute an approximate relationship directly from the first node to the second node.

Operation 740 illustrates that the second node may begin performing a second portion of the tracked activity. During the course of performing the second portion of the tracked activity, the second node may log a second activity record for the second portion of the tracked activity.

Operation 750 illustrates that the second node may retrieve the boundary clock data from the network message. In some embodiments, the second node may be configured to automatically retrieve the boundary clock data, such as by reading the boundary clock data from message headers in the network message and storing the boundary clock data in a thread local storage as part of the initial set of tasks when performing the second portion of the tracked activity. In other embodiments, the second portion of the tracked activity may direct a request to retrieve the boundary clock data from the network message.

Operation 760 illustrates that the second node may log a boundary clock data record pairing the first node and second node. The boundary clock data record may include identifiers for the first node and second node, identifiers for their respective groups, and the boundary clock data. The boundary clock data record may be logged by, for example, writing the record to a log file or tracing service.

Operation 770 illustrates that a second portion of the tracked activity running on the second node record may be logged for the tracked activity. The logged second activity record may include a record of performing a second portion of the tracked activity and a second timestamp at which the second portion of the tracked activity was performed. The second activity record may be logged by, for example, writing the record to a log file or tracing service.

Operation 780 illustrates that the first timestamp in the first activity record and the second timestamp in the second activity record may be reconciled using the boundary clock data record. For example, a trace tool such as trace tool 304 of FIG. 3 may reposition or reorder the first portion of the activity or the second portion of the activity by recalculating timestamps based on the boundary clock data record.

In one embodiment, the boundary clock data record may include an identifier correlating the boundary clock data to the tracked activity using the correlation identifier. For example, the trace tool may use specific boundary clock data to perform reconciliation based on correlating the boundary clock data record with the first or second activity record.

In another embodiment, the boundary clock data records for a particular pair of nodes may sequentially overwrite one another. For example, the trace tool, when reconciling activities performed on the first node and the second node, may search backwards through the record for the most recent boundary clock data record specifying a relationship for that pair of nodes.

In another embodiment, the boundary clock data records for other pairs of nodes may be used to approximate boundary clock data. For example, if the trace tool is reconciling activities performed on the first node and the second node, the trace tool may approximate the boundary clock data using a boundary clock data record for the first node and a third node where the second node and third node may have approximately the same clocks as may be indicated by the distributed clock network. As another example, if the trace tool is reconciling activities performed on the first node and the second node, the trace tool may approximate the boundary clock data using a boundary clock data record for the first node and a third node and another boundary clock data record for the third node and the second node.

Figure 8:
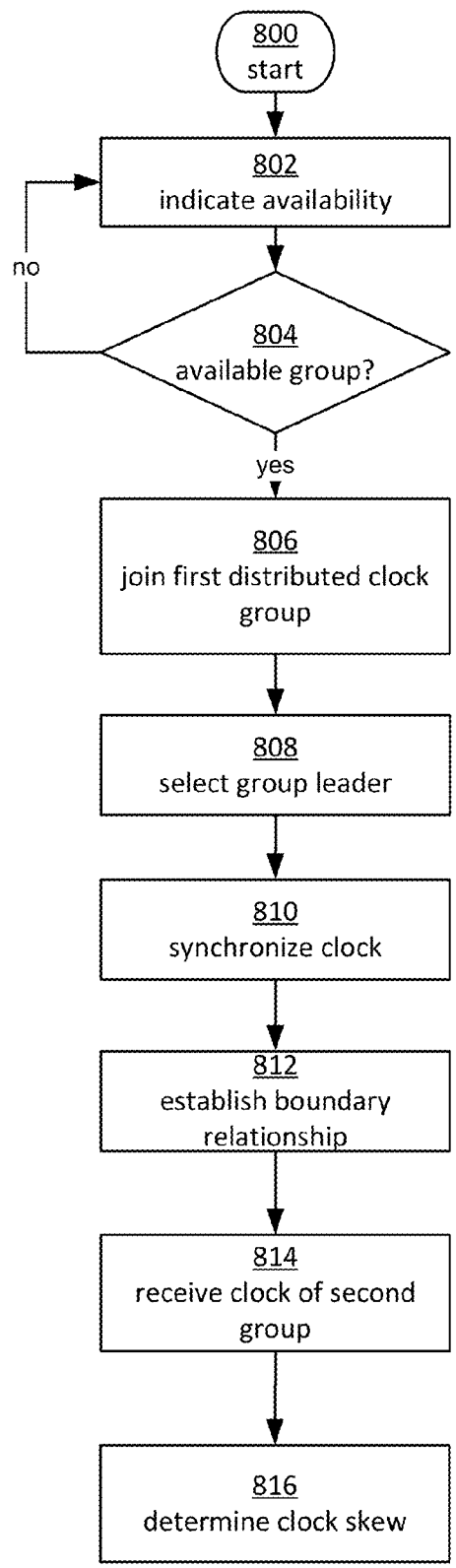
FIG. 8 is a flowchart depicting an example procedure for providing a clock network in accordance with the present disclosure.

FIG. 8 illustrates an example operational procedure for tracking time. In an embodiment, a distributed clock framework can correspond to distributed clock framework 180 in FIG. 1, and the procedure can be implemented in a computing environment comprising a plurality of nodes.

Referring to FIG. 8, operation 800 begins the operational procedure. Operation 800 may be followed by operation 802. Operation 802 illustrates sending, by a first node, a message indicative of an availability to be associated with a distributed clock group.

Operation 802 may be followed by operation 804. Operation 804 illustrates determining if there is a distributed clock group available to join. If a distributed clock group is available to join, then operation 804 may be followed by operation 806. Operation 806 illustrates that in response to receiving an indication to associate with a first distributed clock group, the first distributed clock group may be joined. If a distributed clock group is not available to join, then operation 804 may be followed by operation 802.

Operation 806 may be followed by operation 808. Operation 808 illustrates participating in a process to select a group leader for the first distributed clock group. Operation 808 may be followed by operation 810. Operation 810 illustrates communicating with the group leader to synchronize a clock on the first node with one or more clocks of other nodes of the first distributed clock group. Operation 810 may be followed by operation 812. Operation 812 illustrates establishing a boundary relationship with a second node of a second distributed clock group. Operation 812 may be followed by operation 814. Operation 814 illustrates receiving information indicative of a synchronized clock of the second distributed clock group. Operation 814 may be followed by operation 816. Operation 816 illustrates determining a clock skew based at least in part on the information indicative of the synchronized clock of the second distributed clock group.

Figure 9:
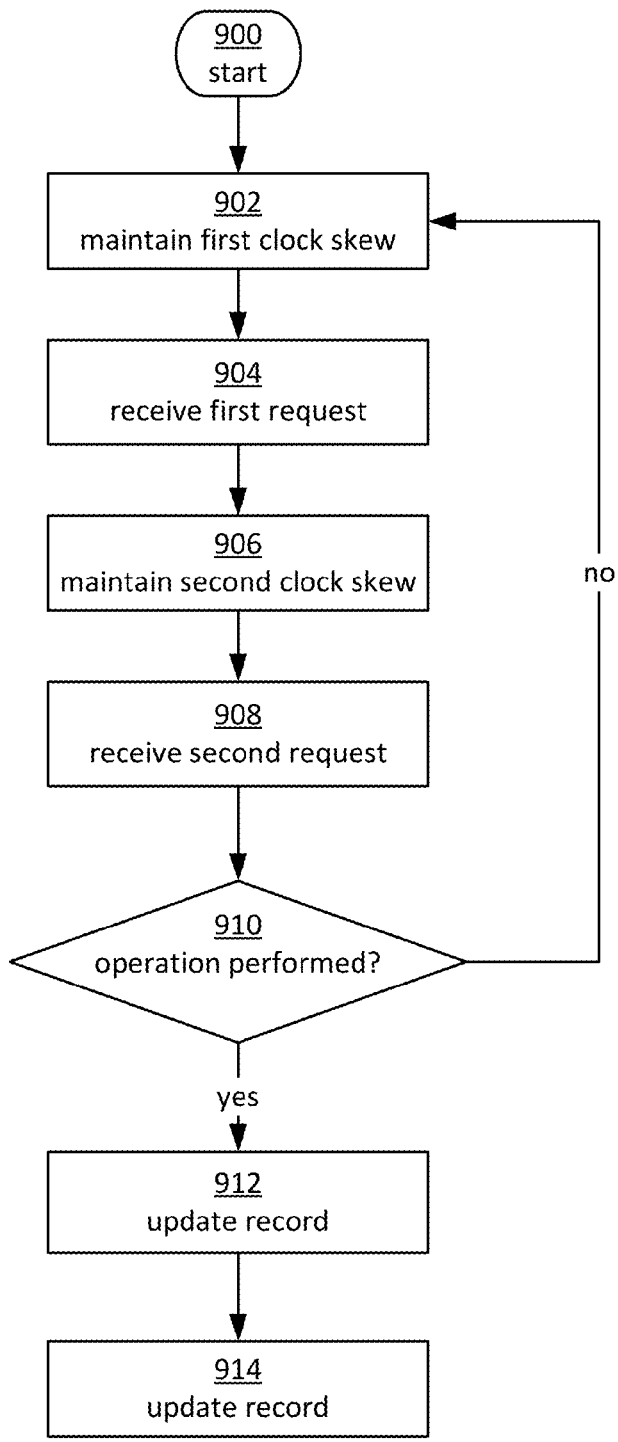
FIG. 9 is a flowchart depicting an example procedure for activity tracing in accordance with the present disclosure.

FIG. 9 illustrates an example operational procedure for tracking time in a network. In an embodiment, a distributed clock framework can correspond to distributed clock framework 180 in FIG. 1. In some embodiments, the procedure may be implemented in a distributed computing environment comprising sets of one or more nodes, the nodes comprising a clock having an associated time, the nodes being configured to synchronize time based at least in part on the associated time and time information exchanged with other nodes in the set.

Referring to FIG. 9, operation 900 begins the operational procedure. Operation 900 may be followed by operation 902. Operation 902 illustrates maintaining, by the first set of one or more nodes, a first clock skew associated with the first set of one or more nodes and the second set of one or more nodes. Operation 902 may be followed by operation 904. Operation 904 illustrates receiving, by at least one node of the first set, a first request indicative of one or more operations related to an activity.

Operation 904 may be followed by operation 906. Operation 906 illustrates maintaining, by the second set of one or more nodes, a second clock skew associated with the first set of one or more nodes and the second set of one or more nodes. Operation 906 may be followed by operation 908. Operation 908 illustrates receiving, by at least one node of the second set, a second request indicative of one or more operations related to the activity. Operation 908 may be followed by operation 910. Operation 910 illustrates determining if one or more operations have been performed. If one or more operations have been performed, then operation 910 may be followed by operation 912. Operation 912 illustrates updating at least one record to indicate performance of the one or more operations by the at least one node of the first set, a first time associated with performance of the one or more operations, and the first clock skew. Operation 914 illustrates updating at least one record to indicate performance of the one or more operations by the at least one node of the second set, a second time associated with performance of the one or more portions of the activity, and the second clock skew. If one or more operations have not been performed, then operation 910 may be followed by operation 902.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the inventions may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for tracking time, the method comprising:
    sending, by a first node, a message indicative of an availability to be associated with a distributed clock group;
    in response to receiving an indication to associate with a first distributed clock group, joining the first distributed clock group;
    participating in a process to select a group leader for the first distributed clock group;
    communicating with the group leader to synchronize a clock on the first node with one or more clocks of other nodes of the first distributed clock group;
    establishing a boundary relationship with a second node of a second distributed clock group;
    receiving information indicative of a synchronized clock of the second distributed clock group; and
    determining a clock skew based at least in part on the information indicative of the synchronized clock of the second distributed clock group.

2. The method according to claim 1, further comprising associating at least one operation with the determined clock skew and determining when the at least operation occurred relative to the first distributed clock group or the second distributed clock group.

3. The method according to claim 1, further comprising:
    establishing a boundary relationship with a third node of a third distributed clock group;
    receiving information indicative of a synchronized clock of the third distributed clock group; and
    adjusting one or more of the clocks of the other nodes of the first distributed clock group to the synchronized clock of the third distributed clock group.

4. The method according to claim 1, further comprising establishing communications with additional nodes of additional distributed clock groups so as to form a polytree.

5. A computer-implemented method for coordinating clocks in a distributed computing environment, the method comprising:
    joining, by a first node that has a machine clock, a first group of nodes, wherein each node of the first group of nodes has a respective machine clock;

synchronizing the machine clock of the first node with other nodes in the first group of nodes to establish a first group clock for the first group of nodes;

communicating with a second node of a second group of nodes having a second group clock for the second group; and based at least in part on the communicating, determining a clock skew between the first group of nodes and the second group of nodes.

6. The computer-implemented method according to claim 5, wherein the first group of nodes is formed in response to publishing availability of a first set of nodes of the first group of nodes.

7. The computer-implemented method according to claim 5, further comprising selecting, by each of the first and second groups of nodes, a respective group leader configured to determine the group clock for each respective group.

8. The computer-implemented method according to claim 7, wherein each respective group leader is selected using a leader election protocol.

9. The computer-implemented method according to claim 7, wherein each respective group leader is selected based at least in part on a topological property of each respective group.

10. The computer-implemented method according to claim 5, wherein the first group clock is determined by sending, by the first node, one or more clock adjustment requests to one or more other nodes of the first group until a group clock adjustment is adopted by each node in the first group.

11. The computer-implemented method according to claim 10, wherein the first and second groups of nodes are configured to evict group members that fail to respond to vote requests or evict group members whose clocks or adjustment requests are significantly above a predetermined level.

12. The computer-implemented method according to claim 5, wherein the first and second groups of nodes are identified by a respective unique identifier.

13. The computer-implemented method according to claim 6, wherein said publishing availability of the first set of nodes comprises one or more of sending multicast messages, registering with a directory service, or communicating with global network coordinator nodes.

14. The computer-implemented method according to claim 5, wherein said communicating comprises:

broadcasting, by at least one node of the first group of nodes, an availability message; and responsive to the availability message, receiving an indication from at least one node of the second group of nodes that the second group is available to establish a boundary relationship with the first group of nodes.

15. The computer-implemented method according to claim 5, further comprising communicating with additional nodes of additional groups of nodes so as to form a polytree.

16. The computer-implemented method according to claim 5, wherein said communicating comprises exchanging respective group clocks between the first and second groups of nodes.

17. The computer-implemented method according to claim 15, further comprising combining at least two of the groups of nodes based at least in part on clock information exchanged between the at least two of the groups of nodes.

18. The computer-implemented method according to claim 5, wherein the first node selects the second node of the second group based at least in part on connectivity between the first node and the second node of the second group.

19. A computing system comprising at least one node and at least one data store in communication with the at least one node, the at least one data store having stored therein computer instructions that, upon execution by the at least one node, at least cause the at least one node to:

join a first distributed clock group;

participate in a leader election process;

maintain a first group clock for the first distributed clock group; and select a second node in the first distributed clock group to establish a boundary relationship with a node of a second distributed clock group.

20. The computing system of claim 19, further comprising computer instructions that, upon execution by the at least one node, at least cause the second node to establish boundary relationships with additional nodes of additional distributed clock groups so as to form a polytree.

21. The computing system of claim 20, wherein the polytree is formed by causing the second node to send a messages to the node of the second distributed clock group and each of the additional nodes of the additional clock groups to determine redundant routing paths between the node of the second distributed clock group and the additional nodes of the additional clock groups.

22. The computing system of claim 19, further comprising computer instructions that, upon execution by the at least one node, at least cause the at least one node to broadcast availability of the first distributed clock group to other distributed clock groups.

23. The computing system of claim 19 wherein the computer instructions that, upon execution by the at least one node, at least cause the at least one node to join the first distributed clock group comprises instructions to broadcast presence messages indicative of availability to join the first distributed clock group or to form the first distributed clock group.

* * * * *